United States Patent [19]

Sakai et al.

[11] Patent Number: 5,424,667

[45] Date of Patent: Jun. 13, 1995

[54] VARIABLE FREQUENCY SIGNAL GENERATING METHOD

[75] Inventors: Ryoichi Sakai, Yokohama; Iwao Akiyama; Yasumasa Fujisawa, both of Tokyo, all of Japan

[73] Assignee: Sony/Tektronix Corporation, Tokyo, Japan

[21] Appl. No.: 962,974

[22] Filed: Oct. 15, 1992

[30] Foreign Application Priority Data

Nov. 21, 1991 [JP] Japan .................................. 3-332642

[51] Int. Cl.6 .......................... H03L 7/18; H03B 19/00
[52] U.S. Cl. ...................................... 327/115; 327/116; 327/121
[58] Field of Search ............... 327/100, 106, 107, 113, 327/115, 116, 121, 294, 298

[56] References Cited

U.S. PATENT DOCUMENTS

| | | | |
|---|---|---|---|
| 4,283,768 | 8/1981 | Scott | 327/121 |
| 4,484,296 | 11/1984 | Treise et al. | 327/116 |
| 4,605,868 | 8/1986 | Penney | 307/351 |
| 4,914,397 | 4/1990 | Gale et al. | 327/116 |
| 5,028,887 | 7/1991 | Gilmore | 327/107 |

*Primary Examiner*—Wolfe Willis R.
*Attorney, Agent, or Firm*—Smith-Hill and Bedell

[57] ABSTRACT

A DDS type variable frequency signal generator generates a jitter free and stable output signal regardless of the address interval. If the total number of addressable memory locations of a memory storing digital data is divisible without remainder by an initial address interval, then the memory is read every initial address interval with a clock signal of a predetermined frequency. If the total number of addressable memory locations is not divisible without remainder by the initial address interval, then the address interval is modified to a value that is divisible without remainder into the total number of addressable memory locations and the clock frequency is modified in accordance with this modification of the address interval. The memory is read every modified address interval with the modified clock signal.

9 Claims, 6 Drawing Sheets

| ADDRESS | | DATA |
|---|---|---|
| DECIMAL | BINARY | |
| 0 | 0000 | 0 |
| 1 | 0001 | 0 |
| 2 | 0010 | 0 |
| 3 | 0011 | 0 |
| 4 | 0100 | 0 |
| 5 | 0101 | 0 |
| 6 | 0110 | 0 |
| 7 | 0111 | 0 |
| 8 | 1000 | 1 |
| 9 | 1001 | 1 |
| 10 | 1010 | 1 |
| 11 | 1011 | 1 |
| 12 | 1100 | 1 |
| 13 | 1101 | 1 |
| 14 | 1110 | 1 |
| 15 | 1111 | 1 |

VARIABLE FREQUENCY SIGNAL GENERATING METHOD

BACKGROUND OF THE INVENTION

This invention relates generally to a variable frequency signal generating method, and more particularly to a method of generating a variable frequency output signal using a DDS type variable frequency signal generator such that the output signal has no jitter regardless of the oscillation frequency.

A variable frequency signal generator is used in many kinds of fields, such as testing electronic equipment. It is very convenient if the frequency of the output signal can be controlled digitally, because a computer can then be used to control the frequency.

A conventional signal generator whose output frequency is controlled in a digital manner is the DDS (Direct Digital Synthesis) system that is discussed, for example, in U.S. Pat. No. 4,605,868. An advantage of the DDS type signal generator is that it is able to generate any desired waveform. The conventional DDS type variable frequency signal generator will be described hereinafter by reference to FIG. 6.

Figure 6:
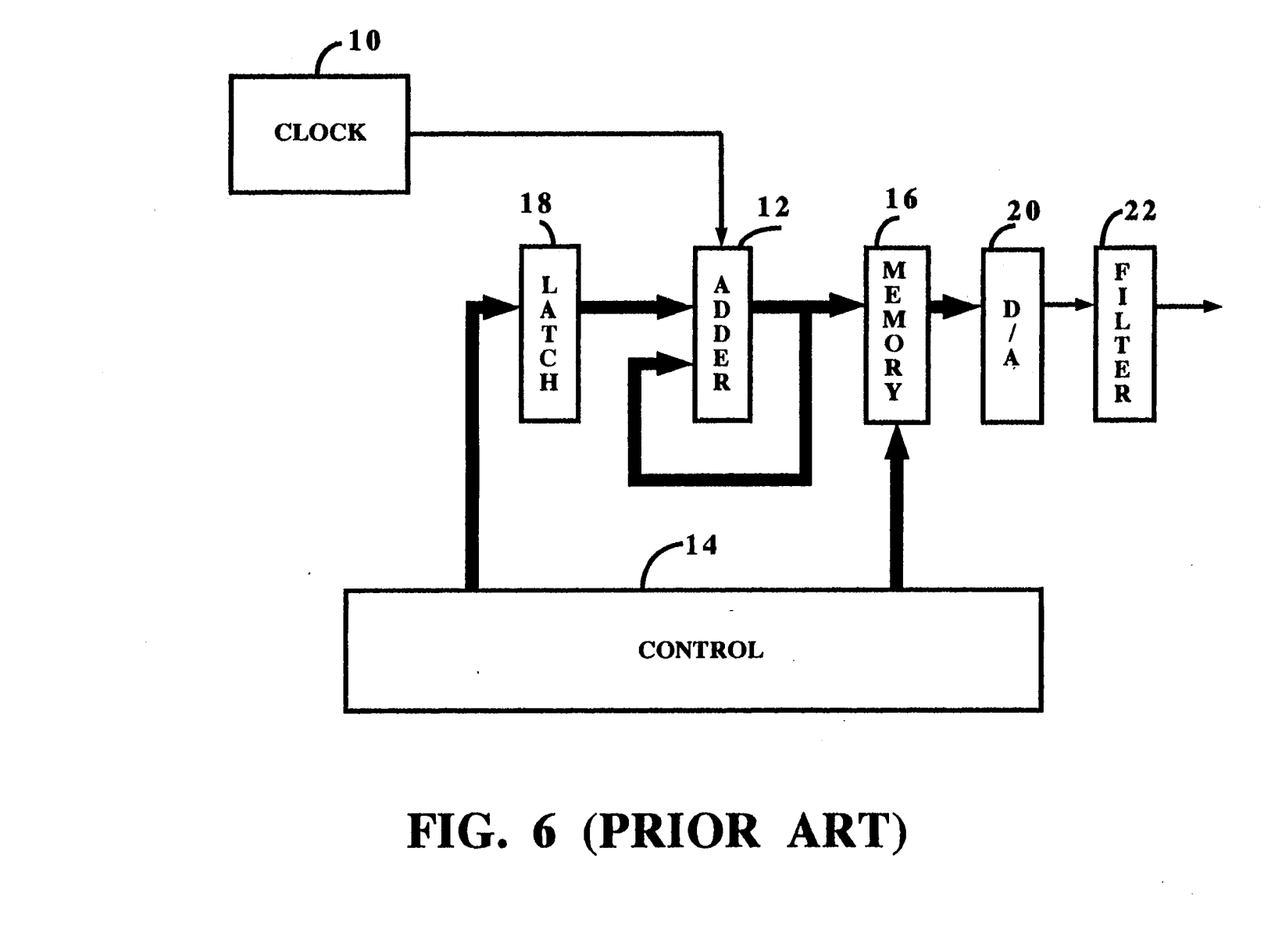
FIG. 6 is a block diagram of a conventional variable frequency signal generator.

A clock generator (clock generation means) 10 generates a clock signal having a predetermined frequency and applies it to the clock terminal of an adder 12. A controller (control means) 14, which comprises a microprocessor, a read only memory (ROM) storing a program, and a random access memory (RAM) as a temporary memory, stores in a memory 16, such as a RAM, digital data corresponding to sample amplitudes of a desired waveform output signal. In addition, the controller 14 calculates an address interval value in accordance with a desired output signal frequency, the waveform data (digital data) stored in the memory 16 and the oscillation frequency of the clock generator 10 and applies the calculated address interval value to a latch circuit 18. The digital adder 12 is initially reset and generates an output corresponding to zero. After that, the adder 12 adds the address interval value from the latch circuit 18 and its own previous output value in order to form an address value to address the memory 16. Thus, the digital data value stored in the addressed location may be read out from the memory 16. As discussed hereinbefore, the adder 12 operates as address data generation means. The digital data from the memory 16 is converted into an analog signal by a digital-to-analog (D/A) converter 20 and filtered by a filter 22 to generate an output signal.

Figure 3:
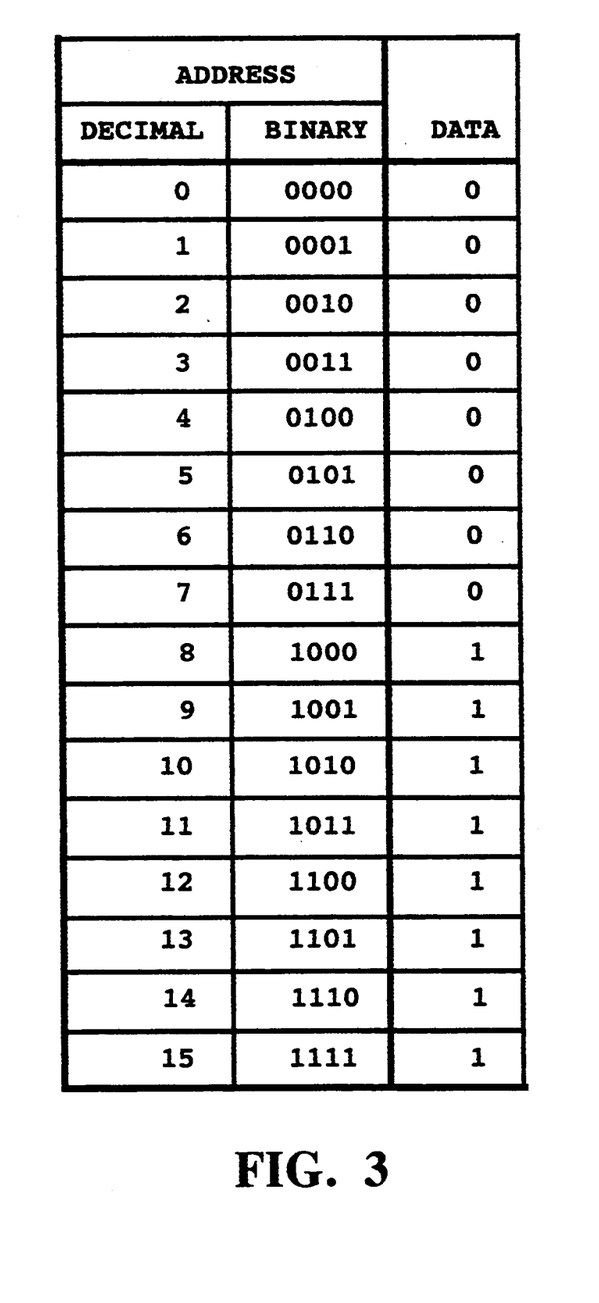
FIG. 3 is a table representative of the relationship between the memory address and digital data value stored therein for the variable frequency signal generator.

Operation of FIG. 6 will be described hereinafter by reference to FIGS. 3 through 5. In order to simplify the explanation of this operation, it is assumed that the memory 16 has sixteen addressable memory locations, having the addresses 0 through 15 in the decimal system (0000 through 1111 in the binary system) and the output signal waveform is a square waveform whose amplitude is 0 or 1. In this specification, the values of the digital data are generally represented in the decimal system. In this instance, the controller 14 stores the digital data in the memory 16 such that the digital data value 0 is stored in the address locations 0 through 7 and the digital data value 1 is stored in the address locations 8 through 15 as shown in FIG. 3. The adder 12 is a four-bit full adder, having four output terminals. The output data value of the adder therefore returns to 0 after reaching 15. The adder also has a carry-in terminal and a carry-out terminal, which are not used and therefore are not shown.

The controller 14 causes the latch circuit 18 to latch an address interval value that is determined in accordance with the clock frequency and the desired frequency of the output signal. First, when the address interval value is assumed to be set to one, the adder 12 increments its digital output signal by one every clock after being reset. Thus, the adder 12 generates the output signal 0, 1, 2, 3, . . . , 14, 15, 0, 1, 2, 3, . . . in this sequence, and the memory 16 is read out with the address interval value of one. The digital data is read from the memory 16, and the D/A converter 20 and the filter 22 convert the data to a pulse signal having the waveform B shown in FIG. 4. This operation is shown in FIG. 4. In FIG. 4, the waveform CLK1 represents the clock signal from the clock generator 10 and the waveform A represents the output signal. If the clock frequency were 250 MHz, the frequency of the output signal would be 15.625 MHz. Numerals written near the output signal waveform represent the output digital value from the adder 12, i.e. the address location of the memory 16 from which the data is read.

When the desired output signal frequency of the DDS type signal generator is twice the frequency of the signal represented by the waveform A, the latch circuit 18 latches the address interval value two from the controller 14. The adder 12 then generates the digital values 0, 2, 4, 6, . . . , 12, 14, 0, 2, . . . in this sequence and the filter 22 produces the output signal waveform B in FIG. 4. For a clock frequency of 250 MHz, the frequency of the output signal would be 31.25 MHz.

Figure 4:
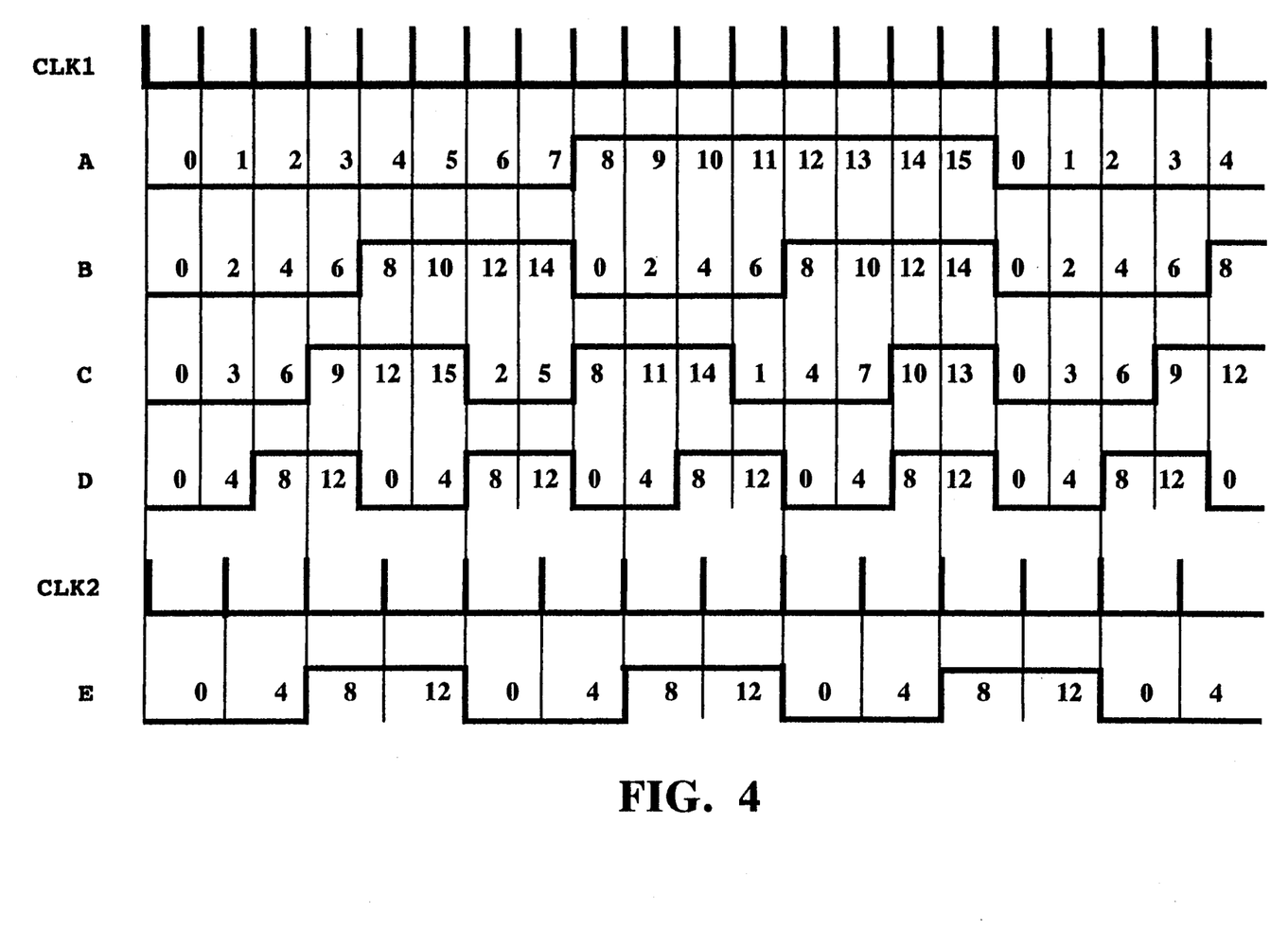
FIG. 4 is a timing diagram illustrating operation of both the present invention and the prior art.
Figure 5:
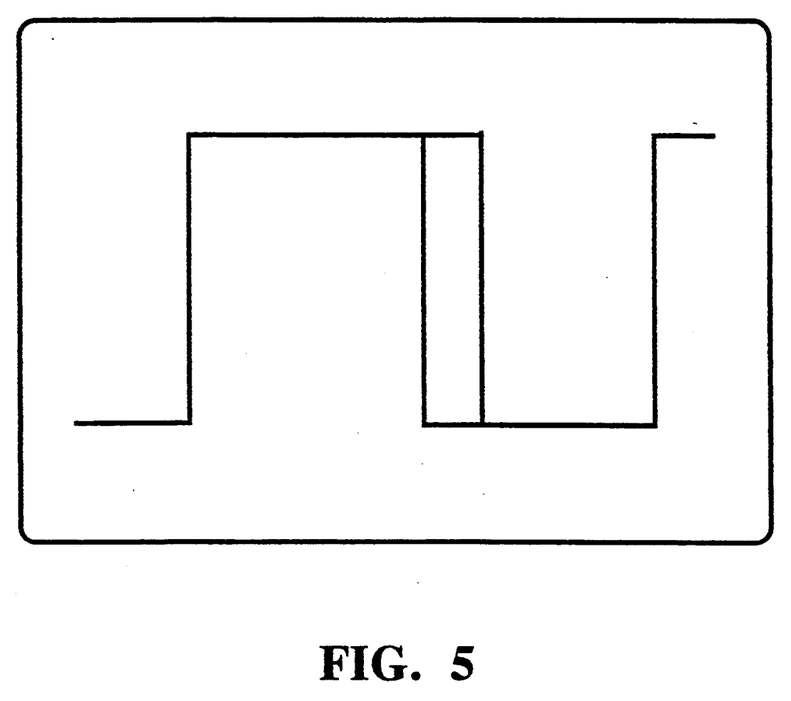
FIG. 5 illustrates the display screen of an oscilloscope by which the output signal from a variable frequency signal generator in accordance with the prior art is observed.

If the latch circuit 18 latches the address interval value three from the controller 14, the adder 12 generates the digital values 0, 3, 6, 9, 12, 15, 2, 5, 8, 11, 14, 1, 4, 7, 10, 13, 0, . . . in this sequence and the waveform C of FIG. 4 is obtained as the output signal from the filter 22. In waveform C, the low and high level intervals between the first and second positive going transitions are each three clock periods, between the second and third positive going transitions the low level interval is two clock periods and the high level interval is three clock periods, and between the third and fourth positive going transitions the low level interval is three clock periods and the high level interval is two clock periods. In other words, the duration of the transition interval (the interval between the time at which the waveform has a first transition from a first nominal state to a second nominal state and a later time at which it has a second transition from the first nominal state to the second nominal state) is not uniform. The output signal is subject to jitter (defined herein as the condition in which the transition interval of the output signal is not uniform) such that for a clock frequency of 250 MHz, the duration of the transition interval varies between 20 ns and 24 ns and has a mean value of 21.33 ns, corresponding to an average frequency of 46.875 MHz. When such a waveform is displayed using an oscilloscope, the waveform may be displayed as shown in FIG. 5 if the trigger slope is +.

This jitter occurs because the transitions contain frequency components at more than twice the clock frequency, and accordingly the Nyquist theorem is not satisfied, and the address interval value is not in an integer relationship to the number of memory locations in the memory 16. Such jitter may occur in output signals having other waveforms, e.g., a fast transition portion of a sawtooth waveform as well as the square waveform.

What is desired to provide a variable frequency signal generating method that is free from the jitter that occurs when the address interval value is not in an integer relationship to the number of memory locations in the memory.

SUMMARY OF THE INVENTION

The present invention is applied to a variable frequency signal generator that comprises clock signal generation means that generates a clock signal, and address generation means that generates an address every clock signal, the address interval of the address being determined in accordance with address interval data. Memory means stores digital data representative of an output signal amplitude and produces the digital data in response to the address. A digital-to-analog converter converts the digital data from the memory means into an analog signal to produce the output signal.

In accordance with the present invention, the digital data is read from the memory means every address interval in response to a clock signal of a predetermined frequency, if the total number of addressable memory locations of the memory means is divisible without remainder by the address interval. If the total number of addressable memory locations of the memory means is not divisible without remainder by the address interval, the address interval data is modified to a number by which the total number of addressable memory locations of the memory means is divisible without remainder, and the clock signal frequency is changed in accordance with this address interval modification. Then, the digital data is read from the memory means every modified address interval in response to the clock signal having the modified frequency.

Thus, the address interval is modified to a number that is divisible without remainder into the total number of addressable memory locations of the memory means. The number of memory locations that are addressed in each transition interval is the same and jitter is eliminated. Since the address interval is modified, the desired output signal frequency cannot be obtained if the clock signal is kept to be the original frequency. In order to obtain the desired output signal frequency, the clock signal frequency is changed in accordance with the modification of the address interval.

The subject matter of the present invention is particularly pointed out and distinctly claimed in the concluding portion of this specification. However, both the organization and method of operation, together with advantages thereof, may best be understood by reference to the following description taken in connection with accompanying drawings wherein like reference characters refer to like elements.

DETAILED DESCRIPTION

Figure 2:
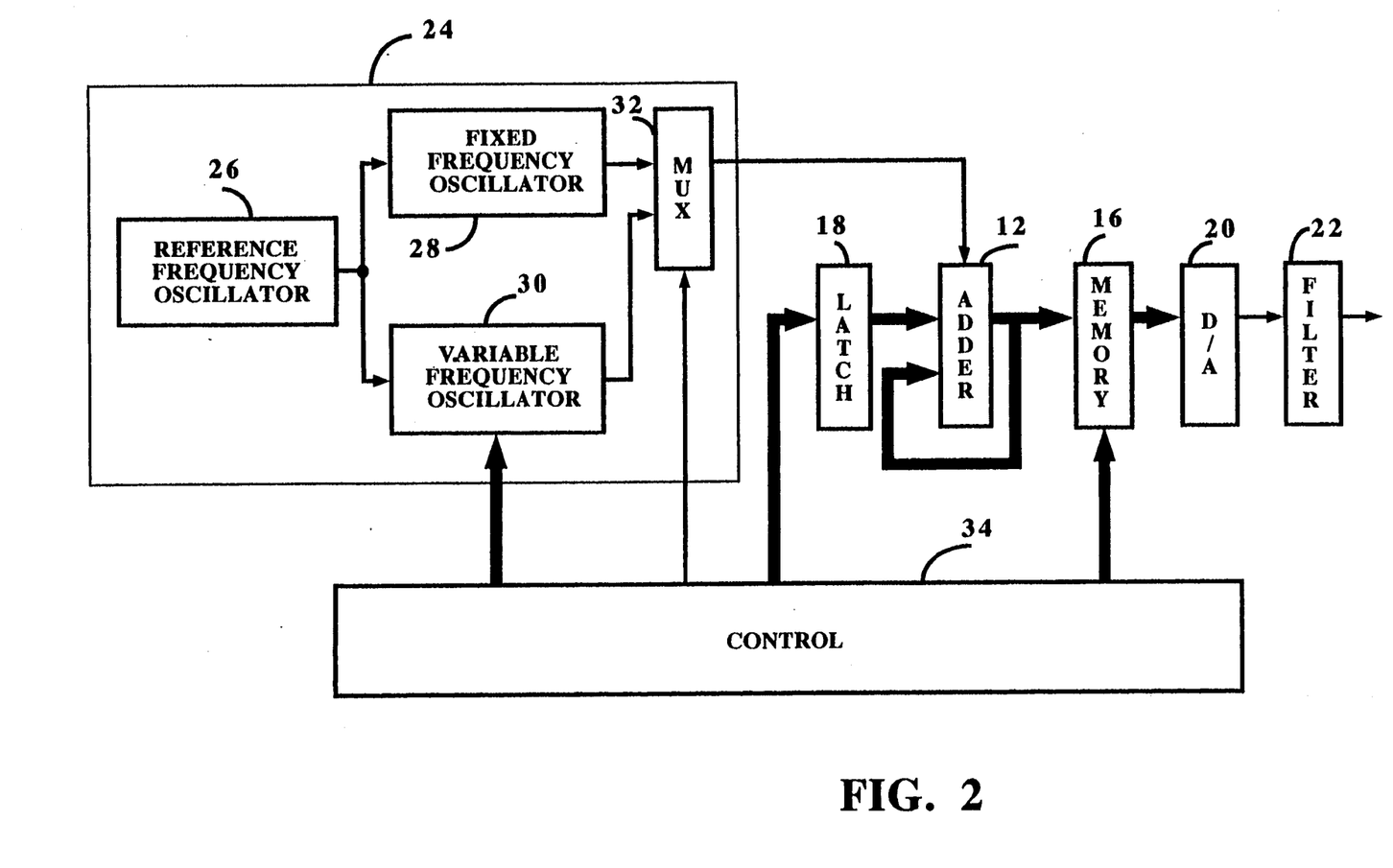
FIG. 2 is a block diagram of a variable frequency signal generator to which the method of the present invention is applied.

Referring to FIG. 2, there is shown a block diagram of a variable frequency signal generator wherein elements 12 and 16 through 22 are the same as the corresponding elements in FIG. 6. However, clock generation means 24 comprises a reference frequency oscillator 26, a fixed frequency oscillator 28, a variable frequency oscillator 30 and a multiplexer (MUX) 32. The reference frequency oscillator 26 may be a crystal oscillator that provides a very stable reference frequency signal, such as a 10 MHz signal. The fixed frequency oscillator 28 provides a signal having a fixed frequency that is higher than the reference frequency, such as 250 MHz, and this fixed frequency signal is phase locked to the reference frequency oscillator 26. The variable frequency oscillator 30 provides a signal of a frequency that is higher than the reference frequency and can be varied, for example between 125 MHz and 250 MHz, and this variable frequency signal is phase locked to the reference frequency oscillator 26. The multiplexer 32 selects the output signal from one of these oscillators 28 and 30. It should be noted that the oscillation frequency range of the variable frequency oscillator 30 covers the oscillation frequency of the fixed frequency oscillator 28 but the oscillators 28 and 30 are provided independently. This is because a fixed frequency oscillator can generally provide a stable sine waveform having a higher C/N ratio (ratio of Carrier to Noise) than can a variable frequency oscillator. If the C/N ratio is not important, the fixed frequency oscillator and the multiplexer are not necessary.

A controller 34 is constructed similarly to the controller 14 of FIG. 6, but this controller 34 can control the oscillation frequency of the variable frequency oscillator 30 and the selection operation of the multiplexer 32 and further can execute many kinds of control operations for the present invention.

In a sweep frequency mode to change the oscillation frequency with time, the controller 34 causes the multiplexer 32 to select the fixed frequency oscillator 28 and changes the address interval value with time. The address interval value is applied to the latch circuit 18. The other operations are the same as the operation described hereinbefore with reference to FIG. 6.

An operation to produce a constant frequency output signal will be discussed hereinafter. The controller 34 stores the digital data to produce the square waveform shown in FIG. 3 in the memory 16 similarly to the operation of FIG. 6. The multiplexer 32 selects the clock signal from the variable frequency oscillator 30 under control of the controller 34.

The relationship between the output signal frequency Fg and the clock frequency Fc of the clock oscillation means 24 is as follows:

$$Fg = N * Fc / (2^n) \qquad (2)$$

wherein N represents the number latched by the latch circuit 18 (address interval value or an interval number of address locations) and n represents the bit width of the adder 12 (four in this embodiment). Thus, $$Fg = N*Fc/16 \qquad (2)$$

Assuming that the controller 34 controls the variable frequency oscillator 30 to provide a 250 MHz clock signal and selects one for the address interval value, the output signal frequency Fg is 15,625 MHz in accordance with the calculation of 1*250/16 MHz. In this instance, the clock signal and the output signal can be represented by CLK1 and the waveform A in FIG. 4, respectively. When the address interval value N is set to two in order to produce the output signal frequency Fg=31.25 MHz and the output signal waveform can be represented by the waveform B in FIG. 4. These operations are the same as the prior art shown in FIG. 6.

Figure 1:
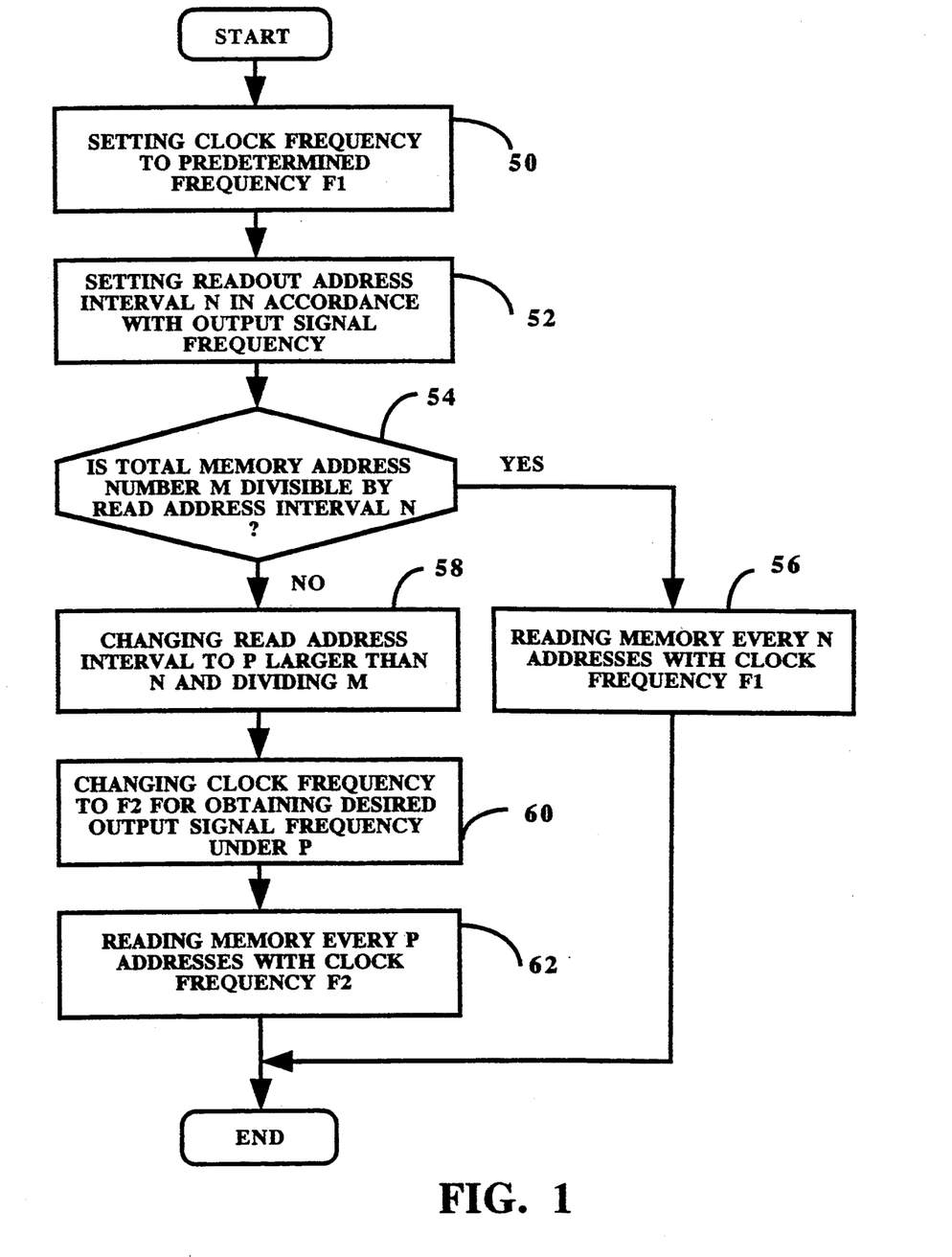
FIG. 1 is a flow chart explaining a method of the present invention.

When the desired output signal frequency Fg is 46.875 MHz, which is the mean frequency achieved by setting the address interval value N to three in the case of the prior art of FIG. 6, a jitter free output signal is produced by controlling the operation as shown in the flow chart of FIG. 1. Each process shown in FIG. 1 is stored in a ROM of the controller 34 and is executed by the microprocessor.

In step 50, the controller 34 sets the oscillation frequency of the variable frequency oscillator 30 to a predetermined frequency F1. The predetermined frequency F1 may be 250 MHz in this embodiment. In step 52, the proper readout address interval N is obtained from equation (2) in accordance with the desired output signal frequency. If Fg=46.875 MHz, N=3 is calculated.

Step 54 determines whether the total number M of memory storage locations (16 in the case of this example) is divisible without remainder by the read address interval N or not. If the output signal frequency Fg is 15.625 MHz or 31.25 MHz, then the read address interval N is 1 or 2 respectively. Thus, in either of those cases the determination by the step 54 is YES and the procedure flows to step 56. In step 56, the memory 16 is read every N addresses with the clock frequency F1. If the output signal frequency Fg is 15.625 MHz or 31.25 MHz, then the memory 16 is read every one address location or two address locations with the clock frequency of 250 MHz. The address interval value is in integer relationship to the number of memory locations, and accordingly jitter does not occur. These operations have been discussed with reference to the waveforms A and B in FIG. 4. After producing the output signal, the process ends.

If the determination result in step 54 is NO, e.g., if the output signal frequency Fg is set to 46.875 MHz and the read address interval N is three, the result is NO because 16/3=5 remainder 1, and the flow is directed to step 58. In step 58, the read address interval value N is changed to a number P that is larger than N and is divisible without remainder into the number M. If Fg=46.875 MHz, then the read address interval is changed to four (P=4). When the read address interval is four, the output signal is represented by the waveform D of FIG. 4 and its frequency is 62.5 MHz if the clock frequency remains at 250 MHz. However, in accordance with the present invention the procedure flow passes to step 60 where the clock frequency is changed to F2 such that the desired output frequency is obtained under the changed read address interval P. The value of F2 is calculated in accordance with $$F2 = 16*Fg/P \qquad (3)$$

which is a modification of equation (2) and returns F2=187.5 MHz. The controller 34 changes the oscillation frequency of the variable frequency oscillator 30 to 187.5 MHz. This clock signal is shown by the waveform CLK2 in FIG. 4.

The procedure then flows to step 62 wherein the memory 16 is read every P addresses with the clock frequency F2. In other words, the memory 16 is read every four addresses with the clock frequency 187.5 MHz and the output signal is represented by the waveform E in FIG. 4. As will be understood from this drawing, the read address interval for the waveform E is in integer relationship to the number of memory locations and so that the output signal is not subject to jitter. Since the clock frequency is changed, the frequency of the output signal is the desired frequency 46.875 MHz. After generating this waveform, the process ends.

As will be understood from the foregoing description, the present invention can generate a stable and jitter free signal regardless-of the address interval value in the DDS type variable frequency signal generator even if the signal does not satisfy Nyquist's theorem.

While we have shown and described herein the preferred embodiment of this invention, it will be apparent to those skilled in the art that many changes and modifications may be made without departing from the invention in its broader aspects. For example, the memory means may be many kinds of memories, such as ROM or the like instead of RAM. The output signal waveform need not be a square waveform.

The total number of storage locations (the address range) of the memory means is sixteen in the embodiment, but this number can be any desired number determined in accordance with the desired application of this invention. In this instance, the address generation means should reset the address to the initial value, i.e., zero, after generating the address representative of the last address location of the memory means. If the total address number of the memory means is 2 to the Q-th power (Q: integer number), the output data width of the address generation means may be Q-bit so that the construction may be simple.

Although the above description is based on the preferred embodiment of the invention, it will be appreciated that various modifications can be made without departing from the scope of the invention. For example, the invention is not limited to only one cycle of the waveform being stored in the memory means. In the embodiment, the read address interval N is changed to a value P that is larger than its initial and is divisible without remainder into the total number of memory locations and the clock frequency is reduced. However, the read address interval may be changed to a value that is smaller than the initial value and is divisible without remainder into the total number of address locations and the clock frequency may be increased in accordance with the change of the read address interval. Therefore, it should be understood that the invention is not limited to the embodiment that has been described, and that the scope of the present invention should be determined only by the following claims and equivalents thereof.

We claim:

1. In a method of generating a variable frequency signal using an apparatus comprising clock signal generation means for generating a clock signal of a predetermined frequency, address generation means for generating a sequence of address values with a predetermined address interval in response to a clock signal, memory means for storing digital data representative of an output signal amplitude and outputting the digital data in response to the address value, and a digital-to-analog converter for converting the digital data from the memory means into an analog signal to generate the output signal of a desired frequency, a method of generating a variable frequency signal, comprising the steps of:

reading the digital data from said memory means every address interval with the clock signal of the predetermined frequency if the total number of addressable memory locations of said memory means is divisible by the address interval value, and if the total number of addressable memory locations is not divisible without remainder by the original address interval value, modifying the address interval value to a value by which the total number of memory locations is divisible, modifying the frequency of the clock signal in accordance with the modification of the address interval, and reading the digital data from said memory means every modified address interval with the clock signal of the modified frequency.

2. A method of generating a variable frequency signal according to claim 1, wherein the step of modifying the address interval comprises increasing the address interval to a value that is larger than the original address interval value and is divisible without remainder into the total address number, and the step of modifying the frequency of the clock signal comprises reducing the frequency of the clock signal to a value lower than the original clock frequency in accordance with the modification of the address interval to generate the output signal of the desired frequency.

3. A method of generating a variable frequency signal according to claim 1, wherein the step of modifying the address interval comprises reducing the address interval to a value that is smaller than the original address interval value and is divisible without remainder into the total address number, and the step of modifying the frequency of the clock signal comprises increasing the frequency of the clock signal to a value higher than the original clock frequency in accordance with the modification of the address interval to generate the output signal of the desired frequency.

4. In a method of generating a variable frequency signal using an apparatus comprising clock signal generation means for generating a clock signal of a predetermined frequency, address data generation means for generating a sequence of address values with a predetermined address interval in response to the clock signal, memory means for storing digital data representative of an output signal amplitude and outputting the digital data in response to the address value, and a digital-to-analog converter for converting the digital data from the memory means into an analog signal to generate the output signal of a desired frequency, a method of generating a variable frequency signal, comprising the steps of:

calculating an address interval value based on the frequency of the clock signal and the desired frequency, if the total number of addressable locations of said memory means is divisible without remainder by the address interval value, reading the digital data from said memory means every address interval with the clock signal of the predetermined frequency, otherwise, modifying the address interval value to a value by which the total number of memory locations is divisible, modifying the frequency of the clock signal in accordance with the modification of the address interval, and reading the digital data from said memory means every modified address interval with the clock signal of the modified frequency.

5. A method according to claim 4, wherein if the total number of addressable locations of said memory means is not divisible without remainder by the address interval value, the method comprises the steps of increasing the address interval to a value by which the total number of memory locations is divisible, reducing the frequency of the clock signal in accordance with the increase of the address interval, and reads the digital data from said memory means every increased address interval with the clock signal of the reduced frequency.

6. A method according to claim 4, wherein if the total number of addressable locations of said memory means is not divisible without remainder by the address interval value, the method comprises the steps of reducing the address interval to a value by which the total number of memory locations is divisible, increasing the frequency of the clock signal in accordance with the reduction of the address interval, and reads the digital data from said memory means every reduced address interval with the clock signal of the increased frequency.

7. A variable frequency signal generator, comprising:

clock signal generation means for generating a clock signal of a predetermined frequency, address data generation means for generating address data in sequence every clock signal, the address interval of the address data being determined by address interval data, memory means for storing digital data representative of an output signal amplitude and outputting the digital data in response to the address data, a digital-to-analog converter for converting the digital data from said memory means into an analog signal to generate an output signal of a desired frequency, and control means for reading the digital data from said memory means every address interval with the clock signal of the predetermined frequency if the total number of addressable memory locations of said memory means is divisible by the address interval value, and if the total number of addressable memory locations of said memory means is not divisible by the original address interval value, said control means modifying the address interval to a value that is divisible without remainder into the total number of addressable memory locations, modifying the frequency of the clock signal in accordance with the modification of the address interval, and reading the digital data from said memory means every modified address interval with the clock signal of the modified frequency.

8. A variable frequency signal generator according to claim 7, wherein the control means is such that if the total number of addressable memory locations of said memory means is not divisible by the original address interval value, said control means increases the address interval to a value that is divisible without remainder into the total number of addressable memory locations, reduces the frequency of the clock signal in accordance with the increase of the address interval, and reads the digital data from said memory means every increased address interval with the clock signal of the reduced frequency.

9. A variable frequency signal generator according to claim 7, wherein the control means is such that if the total number of addressable memory locations of said memory means is not divisible by the original address interval value, said control means reduces the address interval to a value that is divisible without remainder into the total number of addressable memory locations, increases the frequency of the clock signal in accordance with the reduction of the address interval, and reads the digital data from said memory means every reduced address interval with the clock signal of the increased frequency.

* * * * *